(12) United States Patent
Furusawa

(10) Patent No.: US 11,350,613 B2
(45) Date of Patent: Jun. 7, 2022

(54) DEVICE FOR PREVENTING AQUATIC ORGANISMS FROM JUMPING OUT

(71) Applicant: Yosuke Furusawa, Takizawa (JP)

(72) Inventor: Yosuke Furusawa, Takizawa (JP)

(*) Notice: Subject to any disclaimer, the term of this patent is extended or adjusted under 35 U.S.C. 154(b) by 139 days.

(21) Appl. No.: 16/499,819

(22) PCT Filed: Jul. 6, 2018

(86) PCT No.: PCT/JP2018/025768
§ 371 (c)(1),
(2) Date: Sep. 30, 2019

(87) PCT Pub. No.: WO2019/026548
PCT Pub. Date: Feb. 7, 2019

(65) Prior Publication Data
US 2020/0100475 A1 Apr. 2, 2020

(30) Foreign Application Priority Data
Aug. 3, 2017 (JP) .............................. JP2017-151082

(51) Int. Cl.
*A01K 63/00* (2017.01)
*A01M 29/24* (2011.01)
(52) U.S. Cl.
CPC .......... *A01K 63/006* (2013.01); *A01M 29/24* (2013.01)
(58) Field of Classification Search
CPC ...... A01K 63/00; A01K 63/006; A01M 29/24
See application file for complete search history.

(56) References Cited

U.S. PATENT DOCUMENTS

| 5,460,123 A | 10/1995 | Kolz |
| 10,285,394 B1 * | 5/2019 | Granger ................ A01M 29/10 |
| 2005/0000465 A1 | 1/2005 | Wescombe-Down |

(Continued)

FOREIGN PATENT DOCUMENTS

| CN | 1324563 A | 12/2001 |
| CN | 201160418 Y | 12/2008 |

(Continued)

OTHER PUBLICATIONS

Extended European Search Report dated Mar. 4, 2021, in EP Application No. 18842311.5, 8 pages.

(Continued)

*Primary Examiner* — Monica L Barlow
*Assistant Examiner* — Aaron M Rodziwicz

(57) ABSTRACT

A problem to be solved by the present invention is to prevent an aquatic creature from jumping out of a water tank without directly contacting the aquatic creature; and a jump-out prevention device for the aquatic creature, which can solve or reduce the problem, is provided.
The jump-out prevention device for the aquatic creature includes electrode parts arranged along an inner perimeter of a water tank for keeping the aquatic creature; and a power supply part electrically connected to the electrode parts, and configured to apply electrical pulses to the electrode parts. The electrode parts extend in a horizontal direction partially or entirely over the inner perimeter of the water tank, and are arranged in a predetermined underwater region in the water tank. The electrical pulses are applied to the electrode parts.

8 Claims, 12 Drawing Sheets

(56) References Cited

U.S. PATENT DOCUMENTS

2010/0258057 A1* 10/2010 Smith ................... A01K 79/02
119/215
2012/0124918 A1* 5/2012 Zimmerman ............. E04B 1/62
52/101

FOREIGN PATENT DOCUMENTS

| GB | 2505992 A | 3/2014 |
|---|---|---|
| JP | S49-041185 A | 4/1974 |
| JP | S55-140359 U | 10/1980 |
| JP | H03-058724 A | 3/1991 |
| JP | H03-072830 A | 3/1991 |
| JP | 2005-080589 A | 3/2005 |
| WO | WO 2010/149862 A1 | 12/2010 |

OTHER PUBLICATIONS

Office Action dated Mar. 10, 2021, in CN Application No. 201880019188.0, 8 pages.
International Search Report for International Application No. PCT/JP2018/025768 dated Sep. 4, 2018, 10 pages.

* cited by examiner

DEVICE FOR PREVENTING AQUATIC ORGANISMS FROM JUMPING OUT

TECHNICAL FIELD

The present invention relates to a jump-out prevention device for an aquatic creature.

BACKGROUND ART

Conventionally, water tanks have been used to keep aquatic creatures, such as fish, while keeping and appreciating them. In recent years, water tanks have been developed that can cover a space over the water surface with a lid to prevent aquatic creatures from jumping out of the water tanks (see, e.g., Patent Document 1).

The lid provided on such a water tank covers an upper part of the water tank so as to be capable of preventing aquatic creatures from jumping out of the water tank. However, in the case of a large aquatic creature or in the case of a jump-out action with high momentum, there may be a case where the lid is lifted by the momentum when hit, and it becomes difficult to prevent the aquatic creature from jumping out of the water tank.

Also, if an aquatic creature that jumps out of the water surface upward contacts the lid or the like, even if the aquatic creature is prevented from jumping out of the water tank, the body surface of the aquatic creature may be injured, which may cause a risk of bacterial infection due to bacteria invading the aquatic creature from the wound or loss of the commercial value.

RELATED ART DOCUMENTS

Patent Document

Patent Document 1: Japanese Laid-open Patent Publication No. 2005-80589

SUMMARY OF INVENTION

Problem to be Solved by the Invention

In view of these problems, a jump-out prevention device for an aquatic creature has been desired that is capable of preventing the aquatic creature from jumping out of a water tank without directly contacting the aquatic creature.

Means for Solving the Problem

According to an embodiment of the present invention, a jump-out prevention device for an aquatic creature includes electrode parts arranged along an inner perimeter of a water tank for keeping the aquatic creature; and a power supply part electrically connected to the electrode parts, and configured to apply electrical pulses to the electrode parts. The electrode parts extend in a horizontal direction partially or entirely over the inner perimeter of the water tank, and are arranged in a predetermined underwater region in the water tank. The electrical pulses are applied to the electrode parts.

Advantage of the Invention

According to the present invention, in a predetermined underwater region along the inner perimeter of an enclosure part, by giving a stimulus caused by electrical pulses to an aquatic creature to prevent the aquatic creature from approaching the water surface, it is possible to prevent the aquatic creature from jumping out of the water tank without directly contacting the aquatic creature.

EMBODIMENTS FOR CARRYING OUT THE INVENTION

In the following, embodiments for carrying out the invention will be described with reference to the drawings. Note that in order to make the description easily understandable, substantially the same elements are assigned the same reference codes throughout the drawings as much as possible so as to omit duplicated description.

In the following, a jump-out prevention device for an aquatic creature may also be referred to as a jump-out prevention device. Also, the aquatic creatures include all creatures that live underwater, especially creatures that move and live underwater to live. For example, the aquatic creatures include fish; mammals that live mainly underwater such as whales and dolphins; water insects such as giant water bugs and diving beetles; creatures such as jellyfish, squids, octopuses, shrimps, freshwater crabs, crawfish; and the like. The fish include hatchets, African lampeyes, common platy, snakeheads, freshwater fish such as Arowana, seawater fish such as tuna, and brackish fish such as sea basses and mullets.

Here, the water contained in the enclosure part together with aquatic creatures includes fresh water, brackish water, and seawater. The seawater also includes artificial seawater prepared artificially imitating the composition of natural seawater. The water may also include water with adjusted water quality as needed, or liquid or fluid similar to water that is prepared to allow aquatic creatures to live.

First Embodiment

Figure 1:
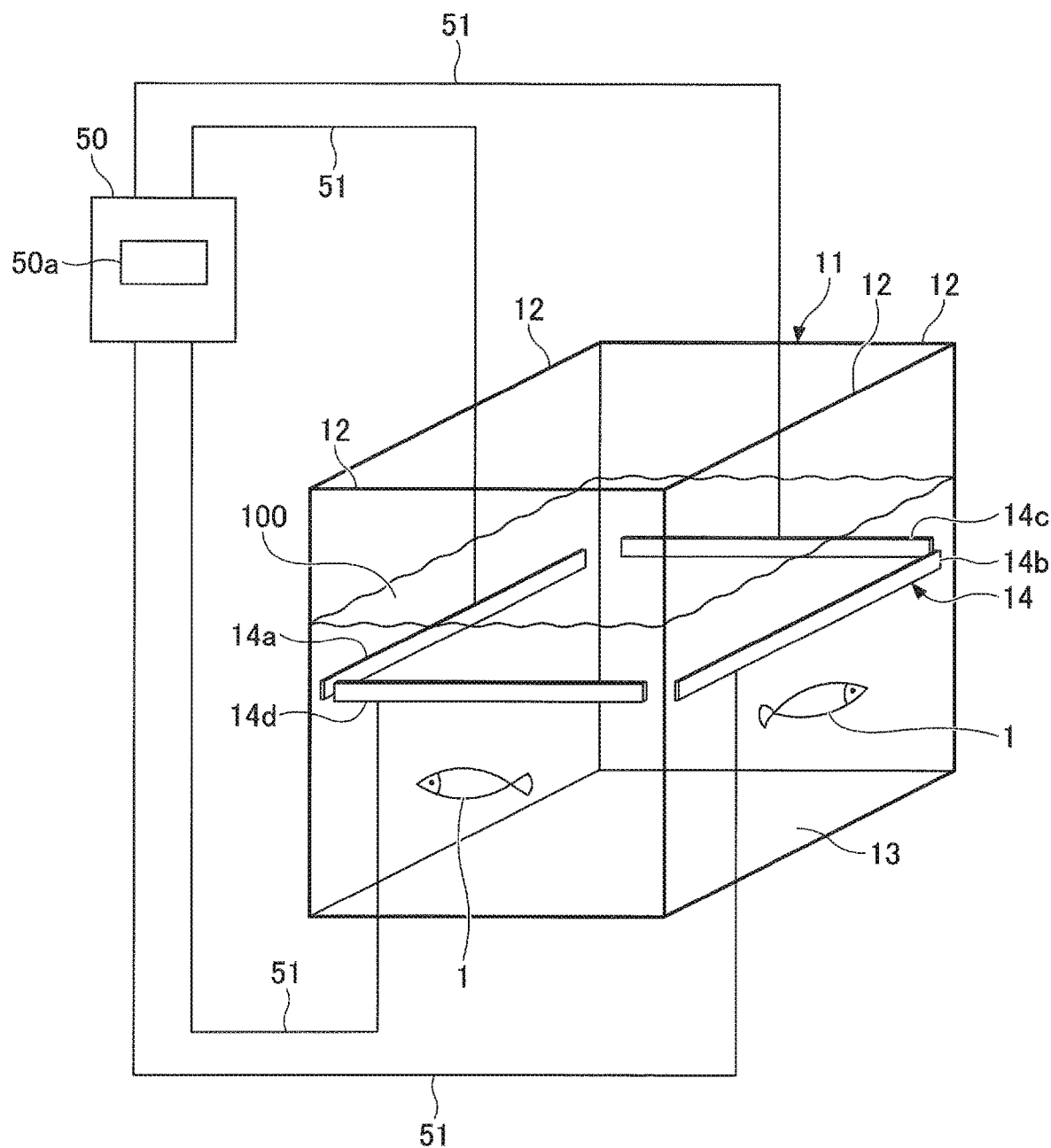
FIG. 1 is a perspective view schematically illustrating a jump-out prevention device for an aquatic creature according to a first embodiment.
Figure 2:
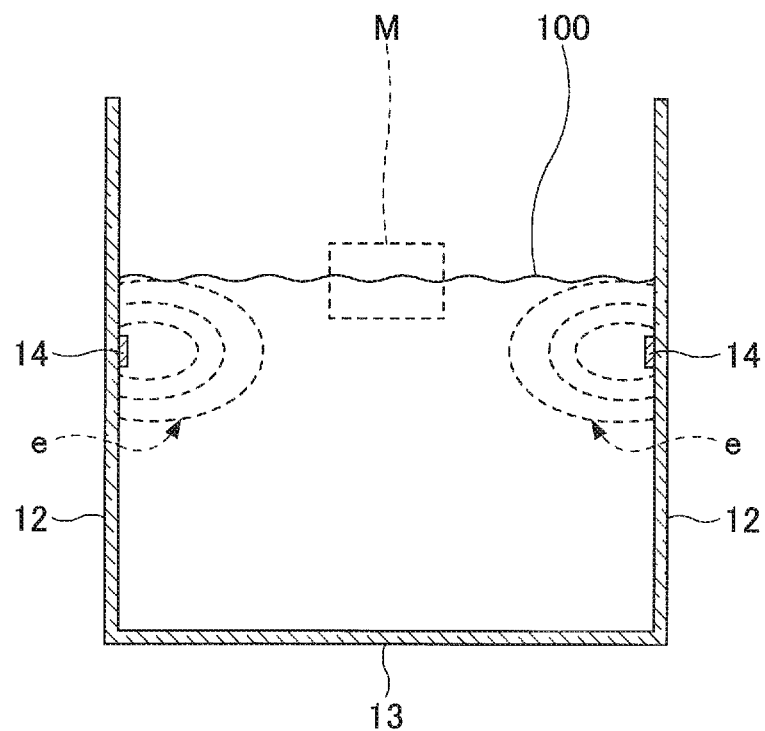
FIG. 2 is a longitudinal cross-sectional view of the jump-out prevention device for the aquatic creature in FIG. 1.

A jump-out prevention device according to a first embodiment will be described based on FIGS. 1 to 5. FIG. 1 is a perspective view illustrating an overview of a jump-out prevention device according to the present embodiment. FIG. 2 is a longitudinal cross-sectional view of the jump-out prevention device in FIG. 1. Note that each drawing is drawn in consideration of ease of view; therefore, the vertical and horizontal sizes may differ from an actual scale, and the scale of each member may differ from actual cases.

As illustrated in FIGS. 1 and 2, the jump-out prevention device 10 is provided in a water tank 11 containing aquatic creatures, and includes electrode parts 14 arranged inside the water tank 11 and below the water surface (particularly, in the vicinity of the water surface) and a power supply part 50 electrically connected to the electrode parts 14 to apply electrical pulses.

First, how the electrode parts 14 are arranged in the water tank 11 will be described.

The water tank 11 has a bottom part 13 and cylindrical sidewall parts 12 extending upward from the bottom part 13, to form a cylindrical shape having a bottom. The water tank 11 of course contains water in addition to aquatic creatures 1, and a water surface 100 is formed. The bottom part 13 and sidewall parts 12 are formed of water-impermeable, wall-like members. In the present embodiment, the bottom part 13 and the sidewall parts 12 are formed of plate members; the bottom part 13 has a virtually rectangular shape; and from each side of the rectangular shape, the similarly rectangular sidewall parts 12 extend. The bottom part 13 is connected with the sidewall parts 12, and the sidewall parts 12 are connected with each other so as not to allow water to pass through. In this way, the water tank 11 has an opening at the upper end and the lower end is closed by the bottom part 13. Therefore, even when water is put into the water tank 11, the water in the water tank 11 will not leak. Therefore, as illustrated in FIG. 1, the water tank 11 can contain water with aquatic creatures 1 that live underwater.

The water tank 11 as such is mainly used on the ground. Here, although the present embodiment will be described in which the bottom part 13 and sidewall parts 12 are formed of plate-like members, the water tank 11 may be embedded, for example, in the ground. Among relatively large water tanks used for aquaculture or the like, a water tank whose bottom part and sidewall parts are formed in a recess formed in the ground or in a foundation made of concrete and paved with concrete or the like, has been known. The jump-out prevention device of the present invention can also be applied to such relatively large water tanks.

The material that forms the bottom part 13 and the sidewall parts 12 is favorably an insulating material, for example, glass, resin, concrete, or the like. The water tank 11 formed of an insulating material prevents leakage of electrical pulses applied to the electrode parts 14, which will be described later, toward the water tank 11, and enables to form an electric field as expected toward water contained in the water tank 11, namely, in the water.

The electrode parts 14 include at least two electrode members electrically separated from each other, and each electrode part is arranged along the internal perimeter, namely, on the inner side of the sidewall parts 12 of the water tank 11. For example, according to the present embodiment, on two pairs of sidewall parts 12 facing each other that extend from the respective sides of the virtually square-shaped bottom part 13, namely, on the inner surfaces of the four sidewall parts, namely, on the surfaces that comes into contact with water when water is put into the water tank 11, electrode members 14a, 14b, 14c, and 14d are provided, respectively. The electrode members 14a, 14b, 14c, and 14d are at least electrically separated from each other. Each of the electrode members 14a, 14b, 14c, and 14d is positioned higher than half the height of the sidewall parts 12 or at a position corresponding to a predetermined underwater region when the water tank 11 contains water. In a state of the water tank 11 containing water, the electrode part 14 is positioned higher than half the water depth and in a predetermined underwater region below the water surface 100; or in the vicinity of the water surface 100, and substantially in parallel with the water surface 100 according to the present embodiment.

As illustrated in FIG. 1, each of the electrode members 14a, 14b, 14c, and 14d is formed linearly, and has a length corresponding to the width in the lateral direction (horizontal direction) of the sidewall part to which it is attached, or a length slightly shorter than the width of the sidewall part. FIG. 1 illustrates an example in which the electrode members 14a and 14b are attached to the sidewall parts 12 facing each other, and the electrode members 14c and 14d are attached to the sidewall parts 12 facing each other. In the example in FIG. 1, the water surface 100 is positioned at about two-thirds the height (or depth) of the entire water tank 11, and the electrode part 14 is positioned around one-fourth the depth of the water surface in terms of the depth from the bottom part 13 to the water surface 100.

In other words, the electrode part 14 extends in the horizontal direction partially or entirely over the inner perimeter of the water tank 11, at a position corresponding to a predetermined underwater region (and a region higher than half the height of the sidewall parts 12) on the inner surfaces of the sidewall parts 12, for example, at a position corresponding to the vicinity of the water surface 100, so as to surround the inner perimeter of the water tank 11 by the entire electrode parts 14 in the present embodiment.

As illustrated in FIG. 2, the outside of the electrode part 14 can be directly fixed to the inner surface of the sidewall part 12. For example, the electrode part 14 is fixed to the water tank 11 by an adhesive (not illustrated). The electrode part 14 is provided to contact water contained in the water tank 11 and is positioned at a height higher than half the height of the sidewall part 12 of the water tank 11. More specifically, it is positioned at a height higher than half the water level when the water tank 11 contains water.

Also, as illustrated in FIG. 1, the electrode parts 14 may extend virtually in parallel with the surface 100. However, the electrode parts 14 may also be inclined relative to the water surface 100 or arranged stepwise at different positions in the depth direction.

The surface of the electrode part 14 is partially or entirely electrically conductive. In addition, the electrode part 14 is configured such that this conductive surface contacts water in a state of being located under the water surface 100, namely, underwater. Also, it is further favorable that the surface of the electrode part 14 has corrosion resistance. Various electrically conductive materials may be used as the materials to form the electrode part 14, for example, metallic materials such as stainless steel, platinum, iridium, ruthenium, rhodium, titanium, copper, chromium, and/or alloy of these; non-metallic materials such as carbon; conductive polymeric materials such as polyacetylene, polypyrrole, polythiophene, and polyaniline; composite materials in which inorganic and/or organic (e.g., carbon) conductive materials are added to the polymeric materials; and the like.

The shape of the electrode part 14 is not limited in particular. The shape of the electrode part 14 may be a belt shape as illustrated in FIG. 1 or a line shape. The electrode part 14 may also be a mesh. The electrode part 14 may be a knitted or twisted wire constituted with multiple linear materials formed of a conductive material described above.

The size of the cross-section perpendicular to the extending direction of the electrode part 14 is not limited in particular. For example, the size of the cross-section of the electrode part 14 may be set depending on the material forming the electrode part 14. In the case where the electrode part 14 is formed of stainless steel, the width of the electrode part 14 is favorably greater than or equal to 0.20 mm and less than or equal to 0.60 mm; or in the case where the electrode part 14 is formed of carbon, the width of the electrode part 14 is favorably greater than or equal to 0.02 mm and less than or equal to 0.06 mm. Setting the size of the electrode part 14 within the range makes it difficult to visually recognize the electrode part 14, and thereby, improves the appearance of the jump-out prevention device 10 as an interior object.

Alternatively, the electrode part 14 may be formed by coating the surface of the sidewall part 12 with a transparent conductive material formed of, for example, ITO, IZO, AZO, GZO, ATO, or the like. The coating may be applied only to a predetermined position in a streak shape or a belt shape, or may be applied entirely to the upper half of the sidewall part 12 or to a region ranging from the water surface to a height corresponding to a predetermined underwater region.

Next, the power supply part 50 will be described.

The power supply part 50 is electrically connected with each of the electrode parts 14 through a wiring part 51 and a connector and/or an electrical contact (not illustrated) so as to be capable of applying electrical pulses to the electrode part 14. More specifically, as illustrated in FIG. 1, the electrode members 14a, 14b, 14c, and 14d are electrically connected to the power supply part 50 via the wiring parts 51. For example, the power supply part 50 includes a battery and/or a power supplying part from an external source; a controller 50a configured to be capable of selectively applying electrical pulses to each of the electrode members 14a, 14b, 14c, 14d, as will be described below; and the like. In the example illustrated in FIG. 1, although the power supply part 50 has the controller 50a built in, the controller 50a may be provided outside the power supply part 50 and may be connected to the power supply part 50 by wire or wirelessly to be capable of communicating with the power supply part 50.

Figure 3:
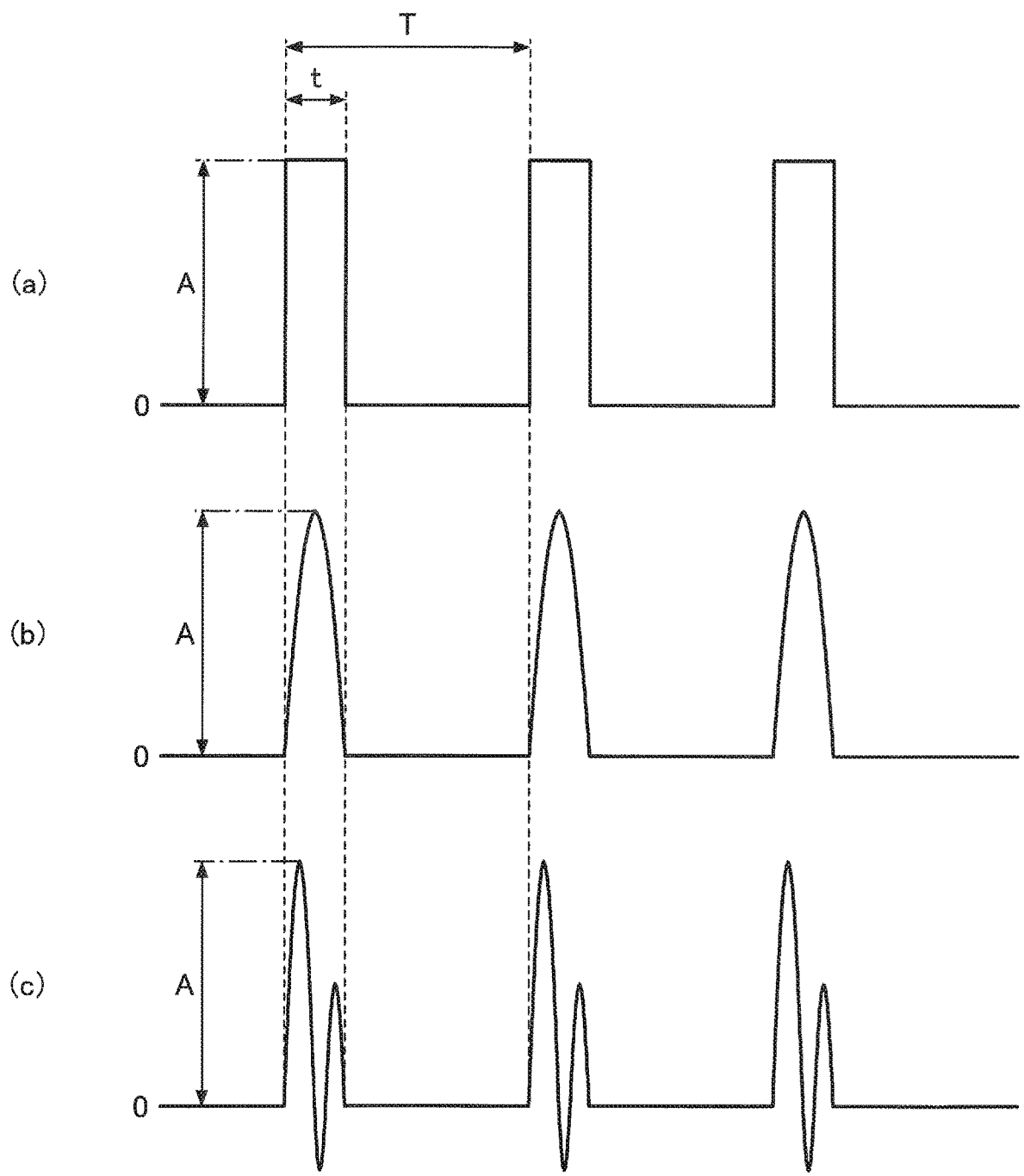
FIG. 3 includes diagrams illustrating examples of electrical pulses applied to an electrode part from a power supply part according to the first embodiment.

FIG. 3 includes diagrams exemplifying electrical pulses applied to an electrode device. FIG. 3(a) illustrates an example of a square wave, and FIGS. 3(b) and 3(c) illustrate examples of sine waves. Any of FIGS. 3(a) through 3(c) illustrates an example of applying electrical pulses of a wave height A. [V] for a period of time t [sec] within a cycle [sec]. In other words, in this case, the duty factor is D=t/T. Note that FIG. 3(c) illustrates an example in which a sine wave whose wave height A gradually decreases in the period t, is applied. In FIG. 3(c), the maximum wave height is presented as a representative value of the wave height A. As such, the wave height A may vary within the period t. Also, there may be a case where the wave height A is negative.

Also, in the example in FIG. 3(a), electrical pulses of a higher frequency may be applied during the period t. In other words, an electrical pulse in FIG. 3(a) may be replaced with electrical pulses of a higher frequency to be applied intermittently. In this case, the frequency of repetition of the intermittently applied high-frequency electrical pulses corresponds to the cycle T, and the frequency of the high frequency applied in one electrical pulse may be referred to as the frequency.

Also, in the examples in FIGS. 3(a), (b) and (c), the voltage/current value for a period in the cycle T during which no electrical pulse is applied may be zero, or may be biased with a DC or AC voltage/current. One may also consider a case in which a weak DC or AC current/voltage component is superimposed.

In the present embodiment, such electrical pulses can be selectively applied to the electrode members 14a, 14b, 14c, and 14d.

For example, the controller 50a of the power supply part 50 may apply electrical pulses to electrode members next to each other (plus side) among the electrode members 14a, 14b, 14c, and 14d, and treats electrode members arranged to face the electrode members to which the electrical pulses are applied as on the ground side (minus side). Alternatively, electrical pulses can be applied to the electrode members facing each other (plus side) to treat electrode members next to the electrode members as on the ground side (minus side). At this time, the electrode members may be selected such that the electrode members on the plus side and the electrode members on the minus side are alternated, for example, at each cycle T.

Also, it is possible to apply electrical pulses to only one or more electrode members among the multiple electrode members 14a, 14b, 14c, and 14d, and to treat the other electrode members as on the ground side (minus side). In this case, the one or more electrode members may be sequentially selected from among the multiple electrode members 14a, 14b, 14c, and 14d to apply electrical pulses. In such a case, an electric field is formed around each electrode member to which the electrical pulses are applied; therefore, it is desirable to alternate the electrode members to which the electrical pulses are applied at a rate sufficiently high with respect to movement of aquatic creatures.

An effect brought when such electrical pulses are applied to the electrode parts will be described.

When such electrical pulses are applied to the electrode parts, electricity propagates through the water via the surface of the electrode members, particularly via the conductive surfaces, and an electric field corresponding to the applied electrical pulses is formed underwater. FIG. 2 illustrates an image of this electric field by dotted lines e. As illustrated in FIG. 2, the electric field e is formed around the electrode parts 14, namely, in a predetermined underwater region where the electrode parts are arranged, as a region that expands inward from the inner perimeter of the water tank 11.

When the electric field e is generated underwater by applying electrical pulses to the electrode parts 14, an aquatic creature 1 senses a stimulus corresponding to the electric field e generated in the region where the electric field e is generated. By adjusting the intensity, cycle, frequency, and the like of the electrical pulses that generate this electric field, it is possible to provide a type of stimulus that a target aquatic creature 1 dislikes particularly. In other words, applying electrical pulses to the electrode members so as to generate an electric field that gives an electrical stimulus which the aquatic creature 1 dislikes, enables to generate a region around the electrode parts 14 which the aquatic creature 1 does not dare to approach.

When the aquatic creature 1 moves from the bottom part 13 side toward the water surface 100 and enters the electric field region e, it receives an electric stimulus. The stimulus becomes more intense as the distance to the electrode part 14 decreases; therefore, the aquatic creature 1 having moved from the bottom part 13 escapes from the electric field region to return to the bottom part 13 without vertically passing through the electric field region e. Therefore, it is possible to prevent the aquatic creature 1 from jumping over the sidewall part 12 from the water surface 100 inside the water tank 11, namely, jumping out of the water tank 11. Here, the aquatic creature 1 vertically passing through the electric field region means that the aquatic creature 1 enters the electric field region from the bottom part 13 side and exits on the water surface 100 side.

In this way, it is possible to prevent the aquatic creature 1 from jumping out of the water tank 11 without contacting the aquatic creature 1. Therefore, it is possible to reduce fatal accidents of the aquatic creatures 1 due to falling down from the water tank 11 caused by jumping-out actions of the aquatic creatures 1, and to control the decline in the number of aquatic creatures 1 accommodated in the water tank 11.

As described above, the jump-out prevention device according to the present embodiment forms an electric field region in a desired region in the water tank 11 by the electrode parts 14 arranged inside the water tank 11. When the aquatic creature 1 enters the electric field region from the bottom part 13 side, the aquatic creature 1 exits the electric field region to return to the bottom part 13 side without vertically passing through the electric field region. Therefore, it is possible to prevent the aquatic creature 1 from jumping out of the water tank 11 from the inside toward the outside.

Note that the "predetermined underwater region" described above refers to a range of heights (positions) of the water tank, or more specifically, of the sidewall part (or the enclosure part, which will be described later), namely, a range of heights higher than half the height of the water tank (or the enclosure part) in the depth direction (closer to the water surface) of the water tank (or the enclosure part). If the electrode part 14 is positioned at this height/position, the electrode part 14 is always positioned higher than half the water depth when the water tank 11 (or the enclosure part) contains water up to the height of the electrode part 14.

Note that according to the present embodiment, as long as the jump-out prevention device 10 can prevent jumping-out actions of the aquatic creatures 1, there may be a region in which no electric field is formed, for example, a region around the center M of the water surface 100 in the water tank 11. This is because it is sufficient to form an electric field in a region where it is otherwise easy for the aquatic creatures 1 to jump out from the inside of the water tank 11 toward the outside of the water tank 11. In the vicinity of the center M of the water surface 100 in the water tank 11, even if the aquatic creature 1 exits from the water surface 100 in the water tank 11 through a region where no electric field is formed, it is difficult for the aquatic creature 1 to jump over the sidewall part 12 to the outside of the water tank 11.

Also, although the intensity of a stimulus given to an aquatic creature caused by electrical pulses or the intensity of a stimulus felt by an aquatic creature depends on the magnitude of the wave height and the average, the intensity also depends heavily on other parameters such as the frequency. In other words, the sensitivity of an aquatic creature to a stimulus is not only intensity-dependent, but also frequency-dependent. Therefore, in order to obtain a stimulus that is intense enough to give a desired effect on an aquatic creature, various parameters of the electrical pulse to be applied, such as the intensity, frequency, cycle, duty factor, and the like, may be adjusted. Also, such dependencies vary depending on the size, type, and the like of aquatic creatures. Therefore, considering the sensitivity dependency, for example, the frequency dependency of an aquatic creature to be guided, by selecting the most sensitive frequency, relatively low-intensity electrical pulses can give a sufficiently intense stimulus. Controlling the strength, e.g., voltage or current values, of the electrical pulses enables to reduce the power consumption of the entire system. It also enables to minimize undesirable effects on aquatic creatures to be prevented from jumping out, such as shocks due to excessively intense voltage/current or damage to skin, muscles, viscera, and the like. Also, the effect on electrodes due to electric corrosion and the like can be reduced. In other words, by selecting optimum parameters, for example, an optimum frequency, with respect to an aquatic creature to be prevented from jumping out, it is possible to prevent the aquatic creature from jumping out with a less intense electric field that gives a sufficient stimulus.

More specific parameters of the electrical pulses applied to the electrode parts 14 are not limited in particular as long as an electric field can be formed in a desired underwater region. Also, the parameters of the electrical pulses applied to the electrode parts 14 are determined by, for example, the shape of the water tank, the size of the water tank, the kind of aquatic creature, the size of the aquatic creature, the quality of water, and the like. For example, the voltage of the electrical pulses applied to the electrode parts 14 may be greater than or equal to 9 V and less than or equal to 16 V. Further, the frequency of the electrical pulses is favorably greater than or equal to 0.1 kHz and less than or equal to 10.0 kHz, more favorably greater than or equal to 0.1 kHz and less than or equal to 5.0 kHz, and even more favorably greater than or equal to 0.5 kHz and less than or equal to 1.5 kHz. Also, the frequency of the electrical pulses to be applied may be varied within a predetermined frequency range for different periods of time. As this frequency range, for example, a range of 0.1 to 2.0 kHz, 0.5 to 1.5 kHz, 0.8 to 1.1 kHz, 0.5 to 1.0 kHz, or the like may be used. The frequency may be varied so as to periodically sweep this frequency range depending on the time, or may be randomly selected within this frequency range. Applying electrical pulses to the electrode parts 14 with the varying frequency in this way enables to prevent jumping-out actions regardless of the kind and/or size of the aquatic creatures. Similarly, electrical pulses may be applied to the electrode parts 14 while varying the parameters such as the voltage and duty factor of the electrical pulses.

For example, in the case where the water tank is placed in an environment in which a static water surface without waves is formed, the electrode parts 14 are favorably provided underwater at a depth greater than or equal to 3 cm and less than or equal to 5 cm; or in the case of an environment in which waves tend to be generated, the electrode parts 14 are favorably arranged underwater at a depth deeper than the wave height so that the electrode parts 14 do not appear above the water surface. This enables to more securely prevent jumping-out actions of the aquatic creatures 1.

Also, the number of the power supply parts 50 to be installed is not limited in particular; as illustrated in FIG. 1, one power supply part may be provided for multiple electrode members, or multiple power supply parts may be provided for multiple electrode members, respectively.

Also, the shape of the cross-section of the water tank 11 perpendicular to the depth direction may be a square as illustrated in FIG. 1, or may be a rectangle, circle, oval, or the like. Depending on the cross-sectional shape of the water tank 11, the installation configuration of the electrode parts 14 is set properly.

Also, although the electrode parts 14 include the electrode members 14a, 14b, 14c, and 14d, the installation configuration of the electrode parts 14 is not limited in particular as long as the electrode parts 14 include at least two electrode members. Two or three among the electrode members 14a, 14b, 14c, and 14d may be combined electrically and/or structurally to form an integral structure. Also, for example, each of the electrode members 14a, 14b, 14c, and 14d may be divided into two or more parts. Dividing the electrode members into a large number of parts has an advantage that it is possible to individually adjust on and off or parameters of electrical pulses for each portion along the inner perimeter of the water tank 11. Also, multiple electrode members may be formed to be structurally connected (while electrically disconnected). Configured as such, the connected structure has an advantage that installation work of the electrode members is simplified. Also, although the electrode members 14a, 14b, 14c, and 14d have the same shape according to the present embodiment described above, it is possible to combine electrode devices having different shapes.

Figure 4:
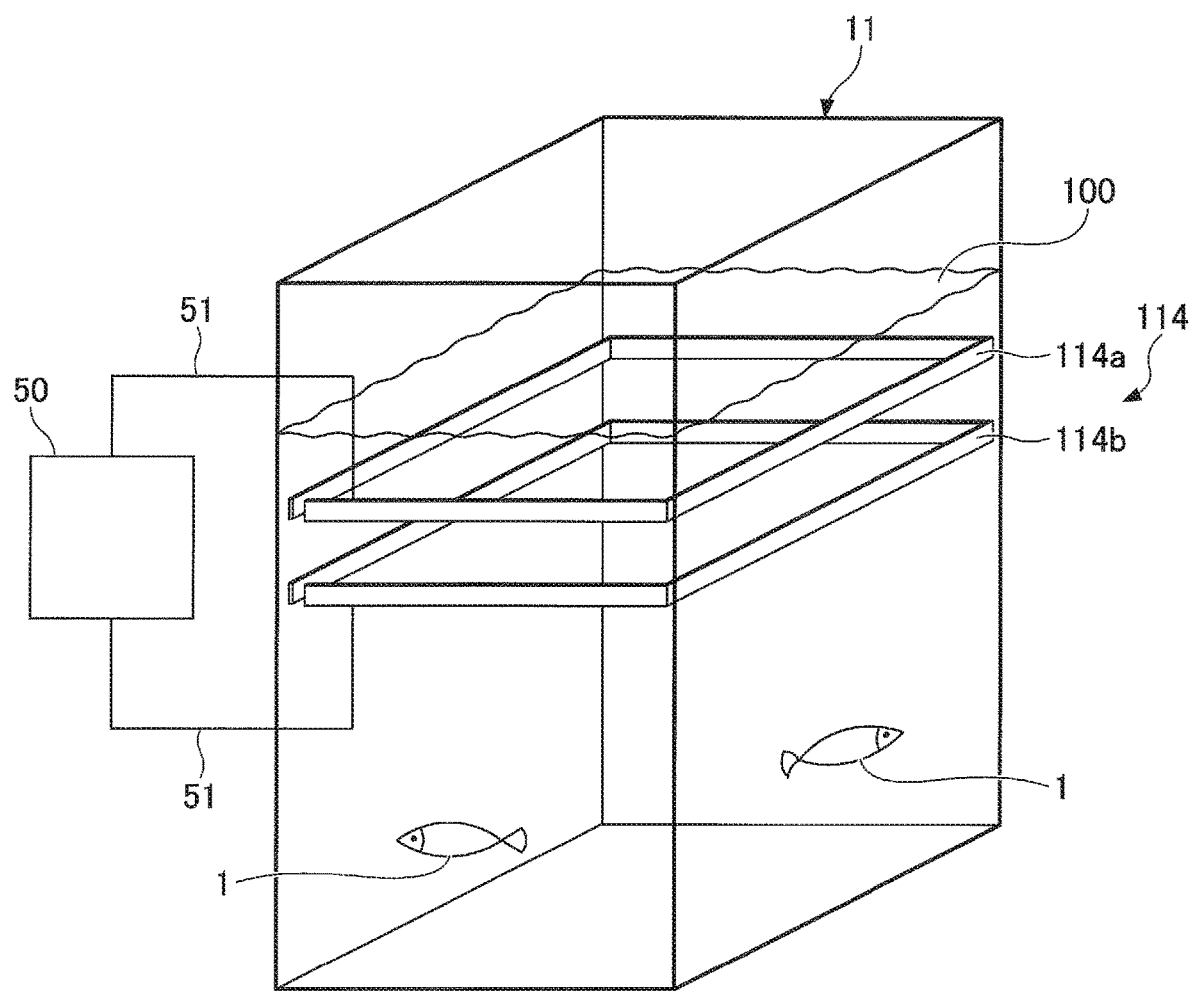
FIG. 4 is a perspective view schematically illustrating a modified example of the jump-out prevention device for the aquatic creature according to the first embodiment.

FIG. 4 is a perspective view schematically illustrating a modified example of the jump-out prevention device according to the present embodiment. As illustrated in FIG. 4, a jump-out prevention device 10a has electrode parts 114 instead of the electrode parts 14 of the jump-out prevention device 10 in FIG. 1. The electrode parts 114 include a first electrode member 114a and a second electrode member 114b.

Each of the first electrode member 114a and the second electrode member 114b illustrated in FIG. 4 has a virtually loop shape with an open part and is arranged on the inner circumferential surface of the water tank 11 virtually in parallel with the water surface 100. Each of the electrode members 114a and 114b has a part that is at least electrically disconnected. In FIG. 4, although each of the electrode members 114a and 114b has the part that is also structurally disconnected, it may be formed to be only disconnected electrically, but closed structurally as a loop. The second electrode member 114b is provided below the first electrode member 114a. The first electrode member 114a and the second electrode member 114b are provided with a predetermined interval in the depth direction and are at least electrically disconnected from each other. For example, the first electrode member 114a and the second electrode member 114b may be formed on the surface of one electrically insulating base member formed as a closed loop, so as to constitute an integrated electrode part 114.

Figure 5:
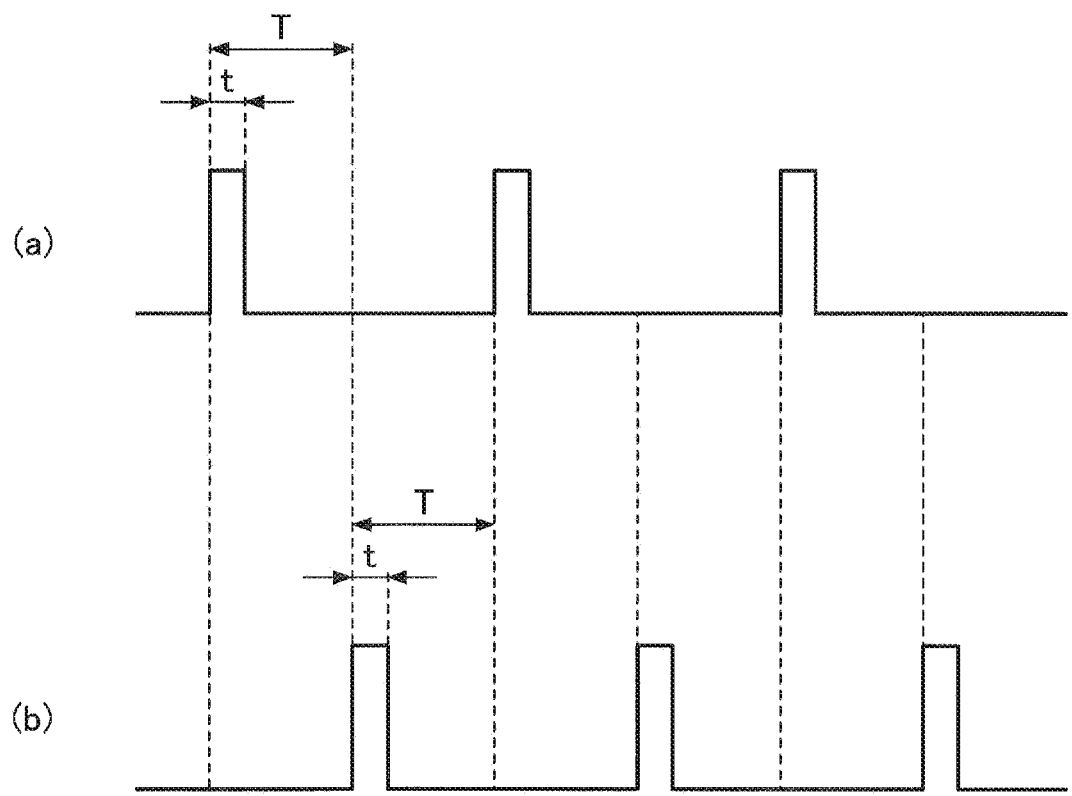
FIG. 5 includes diagrams it examples of electrical pulses applied to an electrode part from a power supply part according to the modified example in FIG. 4.

An example of electrical pulses applied to the electrode members 114a and 114b via the power supply part 50 is illustrated in FIG. 5. The power supply part 50 can apply electrical pulses such as those illustrated in FIG. 3(a) to the electrode members 114a and 114b, respectively, at timings offset from each other. In other words, electrical pulses illustrated in FIG. 5(a) can be applied to the first electrode member 114a, and electrical pulses illustrated in FIG. 5(b) can be applied to the second electrode member 114b. Applying the electrical pulses in this way, in the first cycle T, the first electrode member 114a is in a high state (plus side), whereas the second electrode member 114b is in a low state (minus side), and the states are reversed in the next cycle T.

Arranging the electrode members 114a and 114b vertically and alternately applying electrical pulses to the two electrode members in this way enable to generate an intense electric field around each of the electrode members 114a and 114b, especially between the two electrode members 114a and 114b. Thus, like the electric field e schematically illustrated in FIG. 2, an electric field e can be formed around the electrode members 114a and 114b in the underwater vicinity of the water surface, to stimulate aquatic creatures 1 in a predetermined region that expands inward from the inner perimeter surface of the water tank 11. Therefore, the aquatic creatures avoid this region and do not pass through, and thereby, it is possible to prevent the aquatic creatures from jumping out of the water tank 11.

Also, alternately applying electric pulses to both of the electrode members 114a and 114b enables to halve the total time of applying the voltage/current to each electrode member (total time of being in a high state) while maintaining the cycle T; therefore, it is possible to reduce deterioration such as electric corrosion or ion outflow caused by the energized electrode members 114a and 114b.

Further, according to the present embodiment, although an example has been described in which the two electrode members 114a and 114b are arranged vertically, more electrode members may be arranged vertically, and each electrode members may be electrically connected to the controller 50a so that the controller 50a selects desired electrode members from among these multiple electrode members to apply electrical pulses. At this time, the controller 50a may select an electrode member to which electrical pulses are applied depending on factors such as the positions of the water surface 100 and/or the aquatic creatures 1, the quality of water, the shape of the water tank 11, and/or the user's designation.

Second Embodiment

Figure 6:
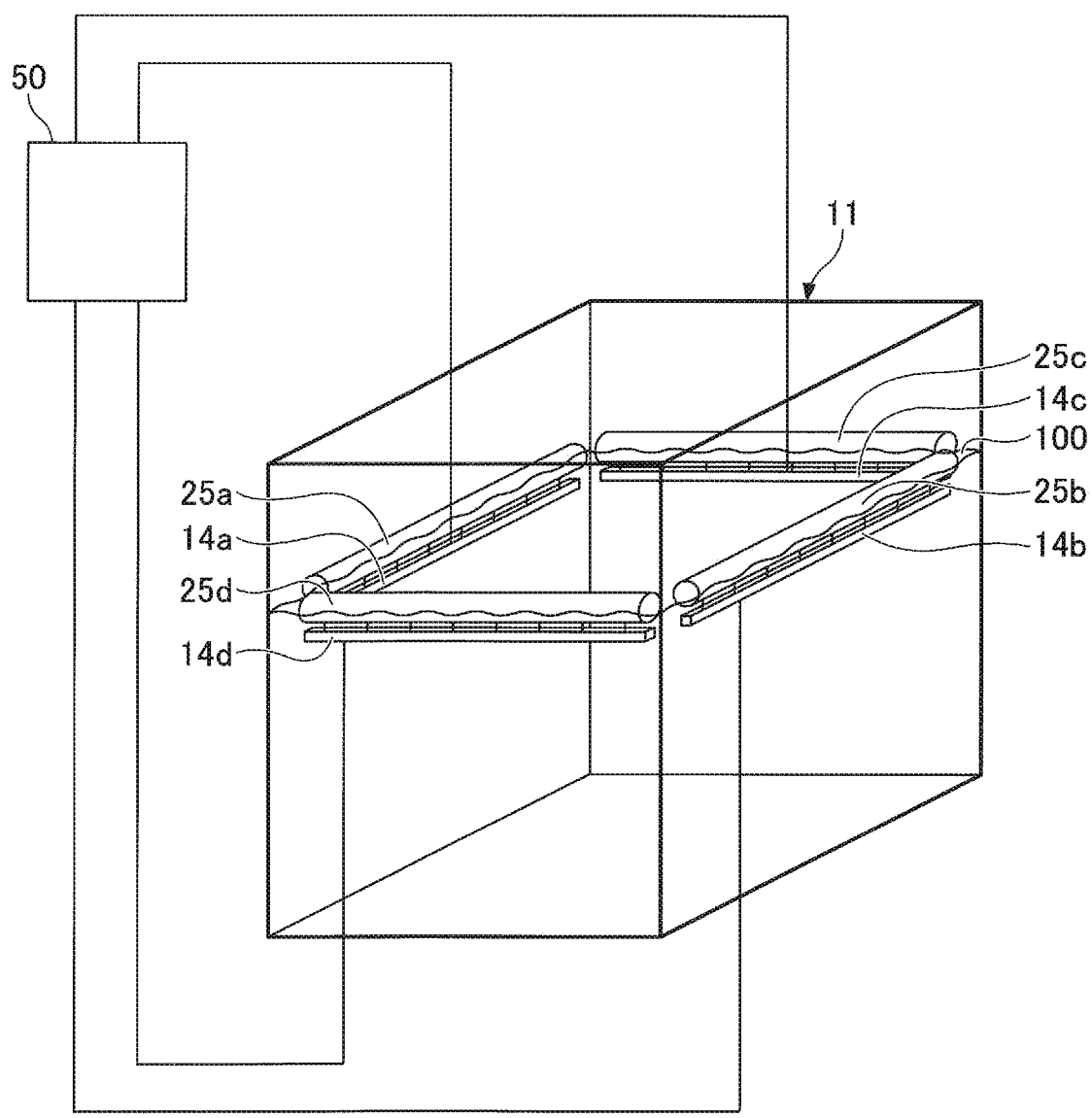
FIG. 6 is a perspective view schematically illustrating a jump-out prevention device for an aquatic creature in a second embodiment.
Figure 7:
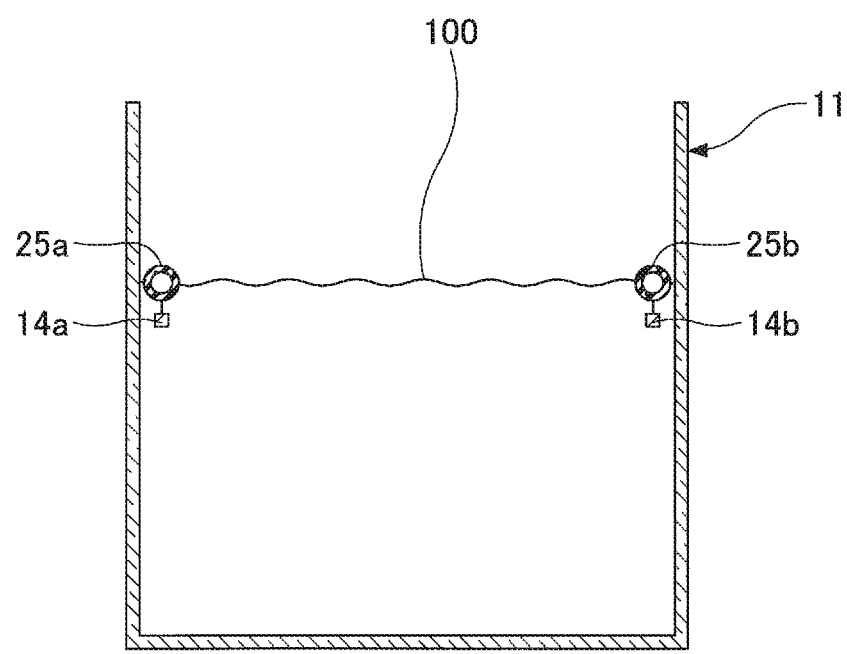
FIG. 7 is a longitudinal cross-sectional view of the jump-out prevention device for the aquatic creature in FIG. 6.

Next, a jump-out prevention device according to a second embodiment will be described based on FIGS. 6 and 7. FIG. 6 is a perspective view illustrating a jump-out prevention device according to the present embodiment. FIG. 7 is a longitudinal cross-sectional view of the jump-out prevention device in FIG. 6.

The jump-out prevention device 20 according to the present embodiment does not have an electrode part 14 attached directly to a water tank 11 as illustrated in FIGS. 1 and 2, but arranged in the water tank 11 via a floating part 25, and in this regard, differs from the jump-out prevention device 10 according to the first embodiment.

As illustrated in FIGS. 6 and 7, the jump-out prevention device 20 includes the water tank 11, the electrode parts 14, a power supply part 50, and the floating parts 25 provided inside the water tank 11. The floating parts 25 can float on the water surface 100 and are arranged on the inner surface of the water tank 11. Also, the floating parts 25 are formed of a water-floating member, such as, for example, polystyrene foam or a balloon. While floating on the water surface 100, the floating parts 25 hold the respective electrode parts 14 on the lower side under the water surface.

For example, as illustrated in FIG. 7, the floating parts 25 include a first floating member 25a having a rectangular column shape that is arranged in the vicinity of the inner surface of a first sidewall member 12a and holds a first electrode member 14a; a second floating member 25b having a rectangular column shape that is arranged in the vicinity of the inner surface of a second sidewall member 12b and holds a second electrode member 14b; a third floating member 25c having a rectangular column shape that is arranged in the vicinity of the inner surface of a third sidewall member 12c and holds a third electrode member 14c; and a fourth floating member 25d having a rectangular column shape that is arranged in the vicinity of the inner surface of a fourth sidewall member 12d and holds a fourth electrode member 14d. The floating parts 25 float on the water surface 100, and maintain the underwater position of the electrode parts 14. For example, the floating parts 25 extend in parallel with the water surface 100.

Each of the floating parts 25 may be configured as follows, so as to be arranged at a predetermined position relative to the sidewall part 12, namely, so as not to be drifted toward the center of the water tank 11. For example, the outside of the floating part 25 is attached to the inner surface of the sidewall part 12 as follows. The inner surface of the sidewall part 12 is provided with a locking part (not illustrated) at a predetermined position in the depth direction. Also, an engagement part (not illustrated) is provided on the outside the floating part 25. Then, by having the engagement part of the floating part 25 and the locking part of the sidewall part 12 engaged with each other, the outside of the floating part 25 is attached to the inner surface of the sidewall part 12. The locking part and the engagement part may be formed as hook-like or connector-like members that engage each other. Alternatively, a chain or string-like member may be provided between the sidewall part 12 and the locking part and/or between the floating part 25 and the engagement part. Such a configuration enables the floating part 25 attached to the sidewall part 12 to move in the depth direction while floating on the water surface 100 as the water surface 100 descends or rises. Alternatively, each floating part may be simply provided with a weight, such as an anchor.

As illustrated in FIG. 6, the electrode part 14 is attached to a lower part of the floating part 25 and is supported by the floating part 25. As illustrated in FIG. 7, the entire electrode part 14 is completely immersed in water. The electrode part 14 is attached to the lower side of the floating part 25, which is a part of the floating part 25 in contact with water, for example, on the lower part of the floating part 25 as illustrated in FIG. 7. Also, as described above, the floating part 25 is attached to the sidewall part 12 and holds the electrode part 14. Therefore, the electrode part 14 may be moved along the depth direction together with the floating part 25 while immersing underwater as the water surface 100 descends or rises.

Thus, the electrode part 14 attached to the floating part 25 moves in the depth direction together with the floating part 25; therefore, the electrode part 14 moves in the depth direction in response to a change of the water surface 100. Therefore, even when the water surface 100 descends or rises, the desired relative position in the depth direction between the electric field region formed by the electrode part 14 and the water surface 100 is maintained. Therefore, even when the water surface 100 changes, the jump-out prevention device 20 can exhibit, the effect of preventing jumping-out actions of the aquatic creatures 1.

Note that as long as the floating part 25 can hold and maintain the underwater position of the electrode part 14, the shape, size, number of installed instances, and the like of the floating part are not limited in particular, and may be set appropriately depending on the size and the number of installed instances of the electrode part 14.

Also, the electrode part 14 itself may have a hollow cylindrical shape with both ends closed to be configured to be floatable on the water surface. At this time, only the surface on the side to be directed underwater may be formed to be conductive. Also, in order to have the hollow cylindrical electrode part 14 properly oriented in the vertical direction, by increasing the density of the sidewall surface to be directed underwater or by providing a weight on the side to be directed underwater, a configuration can be realized in which the conductive part of the electrode part 14 is securely arranged underwater.

Third Embodiment

Figure 8:
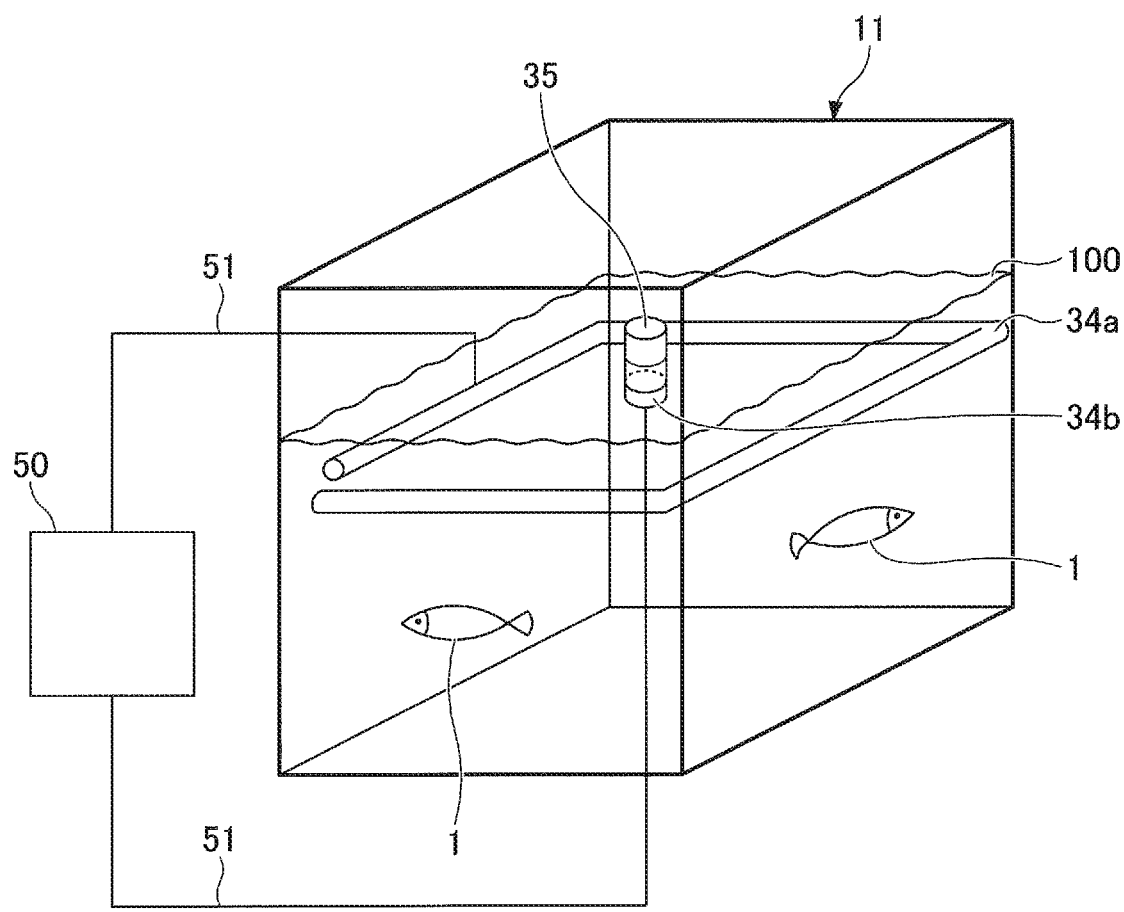
FIG. 8 is a perspective view schematically illustrating a jump-out prevention device for an aquatic creature in a third embodiment.
Figure 9:
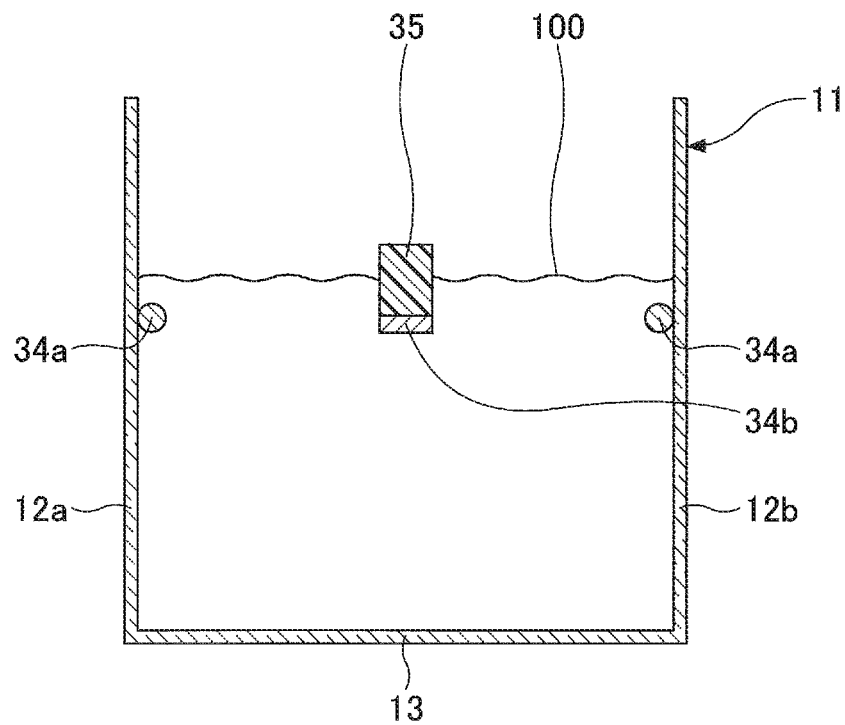
FIG. 9 is a longitudinal cross-sectional view of the jump-out prevention device for the aquatic creature in FIG. 8.

Next, a jump-out prevention device according to a third embodiment will be described based on FIGS. 8 and 9. FIG. 8 is a perspective view illustrating a jump-out prevention device according to the present embodiment. FIG. 9 is a longitudinal cross-sectional view of the jump-out prevention device in FIG. 8.

The jump-out prevention device 30 according to the present embodiment is provided with electrode parts 34 that include an electrode member 34a having substantially the same shape as the electrode member 114a illustrated in the second embodiment in FIG. 4, and as another electrode member, a second electrode member 34b arranged further inward relative to the electrode member 34a in a water tank 11, and in this regard, differs from the jump-out prevention device 10 according to the first embodiment.

As illustrated in FIGS. 8 and 9, the jump-out prevention device 30 includes the water tank 11; the electrode parts 34 including the first electrode member 34a arranged on the inner perimeter of the water tank 11 and the second electrode member 34b arranged further inward relative to the first electrode member 34a; and a power supply part 50 electrically connected to the first and second electrode members 34a and 34b of the electrode parts 34.

The first electrode member 34a is arranged underwater in the vicinity of the sidewall parts 12 of the water tank 11. This first electrode member 34a may be arranged in the water tank 11 by any of the methods according to the embodiments described above. For example, as illustrated in FIGS. 8 and 9, the first electrode member 34a may be attached to the inner surface of the sidewall parts 12. The first electrode member 34a has the same configuration as the first electrode member 114a illustrated in FIG. 6, arranged on the inner perimeter of the water tank 11, and is provided in parallel with the water surface 100 in the water tank 11.

The second electrode member 34b is arranged inside the first electrode member 34a and contacts at least the water surface 100. For example, the second electrode member 34b has a point shape, and as illustrated in FIG. 9, can be provided inside the first electrode member 34a while being held by the floating part 35. As illustrated in FIG. 9, the second electrode member 34b may be attached to the lower side of the floating part 35.

The floating part 35 is formed of a material that can float on the water surface 100 and is provided inside the water tank 11. For example, the floating part 35 is cylindrical and is arranged in the vicinity of the center of the water surface 100 in the water tank 11. Also, the floating part 35 holds the second electrode member 34b while floating on the water surface 100 and maintains the underwater position of the second electrode member 34b in substantially the same way as the floating part 25 illustrated in FIG. 6 works. Therefore, the second electrode member 34b attached to the floating part 35 moves in the depth direction together with the floating part 35. Also, in order to prevent movement of the floating part 35 in a plane parallel to the water surface 100, a connecting member (not illustrated) may be provided that connects the floating part 35 floating on the water surface 100 to the bottom part 13 of the water tank 11.

In the present embodiment, the power supply part 50 applies electrical pulses (plus side) as illustrated in FIG. 3 described above to the outer first electrode member 34a, and treats the inner second electrode member 32b as grounded (minus side). Therefore, an electric field e can be formed around the first electrode 34a, as described above, in the vicinity of the inner perimeter in the vicinity of the water surface, in a predetermined region that expands inward from the inner perimeter surface of the water tank 11, to stimulate aquatic creatures, and thereby, enables to form a region that does not attract aquatic creatures whose lumping-out actions should be prevented as described above. Therefore, it is possible to prevent aquatic creatures from jumping out of the water tank 11 by preventing aquatic creatures from approaching such a region.

As described above, the jump-out prevention device according to the present embodiment includes the first electrode member 34a provided on the sidewall parts 12 and the second electrode member 34b arranged inward relative to the first electrode member 34a. In this way, among the first and second electrode members 34a and 34b, the second electrode member 34b can be arranged simply by floating it on the water surface, and thereby, the electrode parts 34 can be easily installed.

Note that as long as an electric field region can be formed in a desired underwater region, the shape of the first electrode member 34a and the second electrode member 34b are not limited in particular. For example, in FIGS. 8 and 9, although the second electrode member 34a has a point shape or a disc-like shape, the second electrode member may be formed by forming a linear member into a circular or polygonal-shaped loop. Depending on the shape of the second electrode member 34a, the distance between the first electrode member 34a and the second electrode member 34b can be changed. For example, the outer diameter of the second electrode member 34b can be changed in accordance with the size of the water tank 11 so as to set the distance between the first and second electrode members 34a and 34b as desired. If it possible to shorten the distance between the two electrode members, for example, even in the case of the water tank 11 being large, an electric field having a required intensity can be formed, while limiting the intensity of electrical pulses applied to the first electrode member. Also, in the present embodiment, although an example has been described in which the second electrode member 34b is formed as one member, multiple second electrode members may be arranged at different positions in the water tank 11.

In addition, the second electrode member 34b may also be supported from the top or the bottom via the wiring part 51 itself connected to the power supply part 50 without a floating part. In this case, it is favorable to configure the second electrode member 34b to have a linear shape, to be arranged in an orientation intersecting the water surface, and to have a conductive surface at least in the vicinity of the water surface. Configuring in this way, by arranging at least a part of this conductive surface underwater, the conductive surface contacting water enables the second electrode member 34b to function as expected.

Note that the water tank 11 shown in the first to third embodiments described above is arranged on the ground and can be provided with, in addition to the jump-out prevention devices according to the present invention, various device for preparing a growth environment of aquatic creatures with respect to the quality of water, the amount of oxygen, and the like in the water tank 11.

Fourth Embodiment

Figure 10:
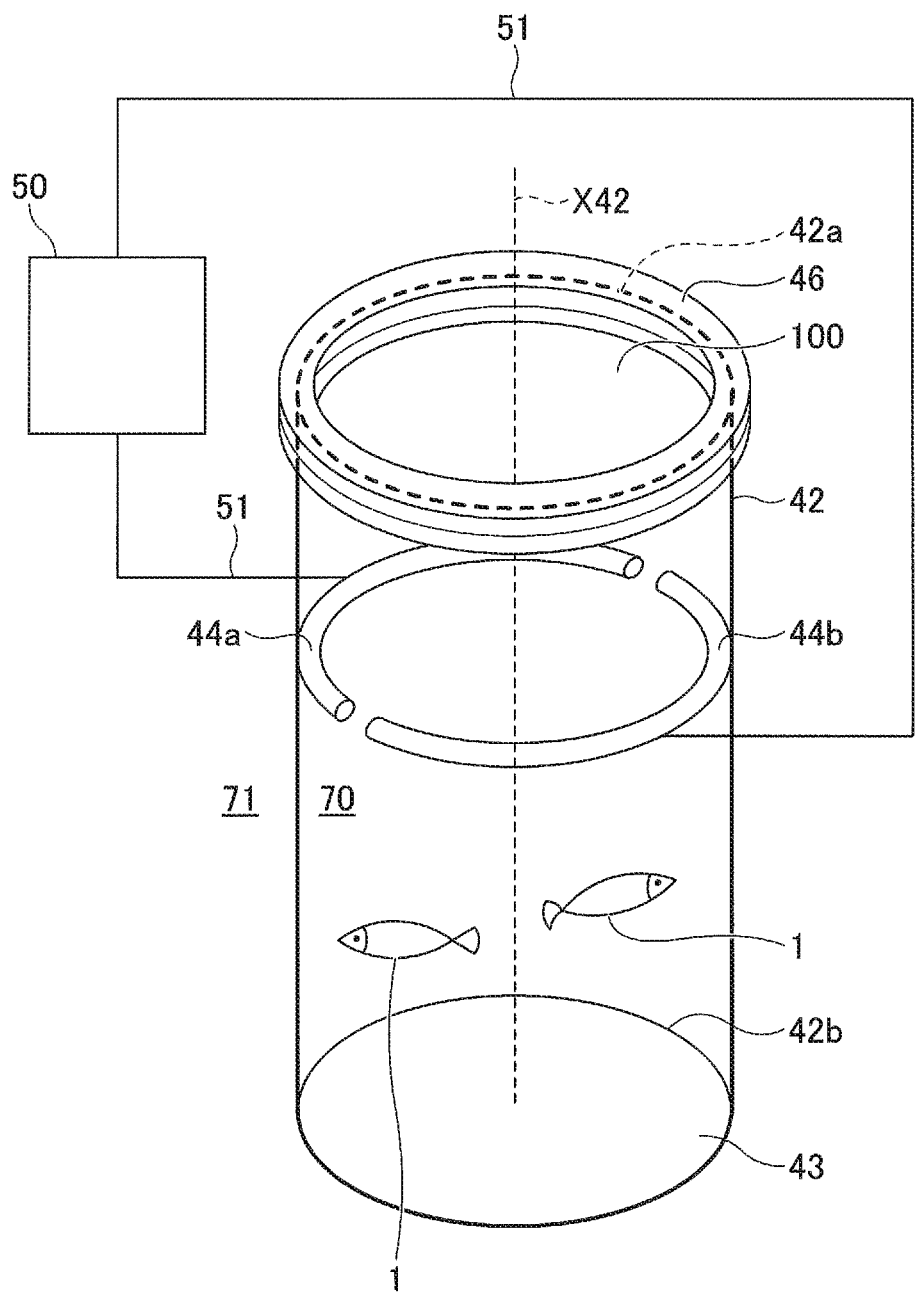
FIG. 10 is a perspective view schematically illustrating a jump-out prevention device for an aquatic creature in a fourth embodiment.
Figure 11:
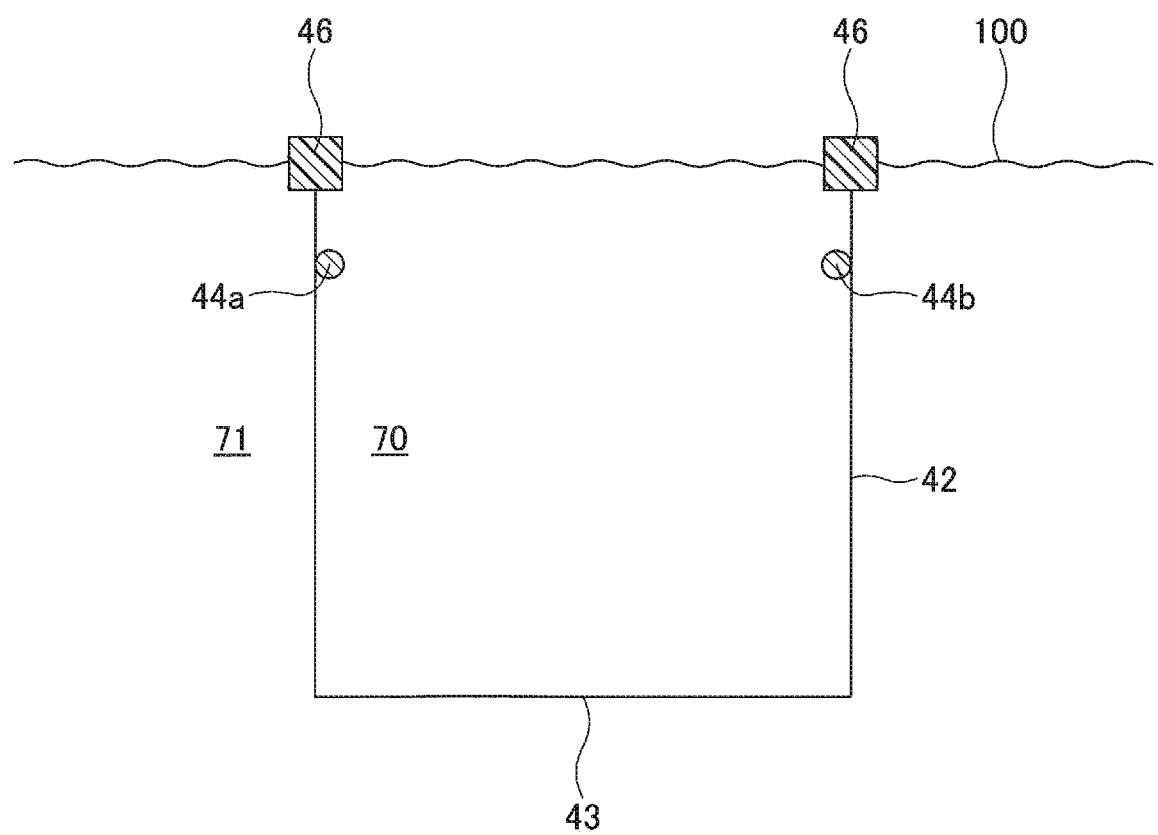
FIG. 11 is a longitudinal cross-sectional view of the jump-out prevention device for the aquatic creature in FIG. 10.

Next, a jump-out prevention device according to a fourth embodiment will be described based on FIGS. 10 and 11. FIG. 10 is a perspective view illustrating a jump-out prevention device according to the present embodiment. FIG. 11 is a longitudinal cross-sectional view of the jump-out prevention device in FIG. 10.

The jump-out prevention device 40 according to the present embodiment is not provided within a water tank 11 as illustrated in FIGS. 1 and 2, but provided within a fence part 42 arranged underwater as illustrated in FIGS. 10 and 11, and in this regard, differs from the jump-out prevention device 10 according to the first embodiment. Note that the fence part 42 is an element that functions as an enclosure part that encloses one or more aquatic creatures in the horizontal direction or in the lateral direction, and may or may not has a bottom lid part covering the lower end of the enclosure part. Here, the enclosure part implemented as the fence part 42 is formed of a mesh member that has a mesh having a size through which aquatic creatures 1 cannot pass through but liquid can pass through, and is placed underwater. For example, the enclosure part is a so-called small-split aquaculture cage formed by a net submerged into the sea or the like. The enclosure part may also correspond to a net used for providing partitions in a water tank.

As illustrated in FIGS. 10 and 11, the jump-out prevention device 40 includes electrode parts 44 arranged on the inside of the fence part 42 formed to surround a central axis X42, and a power supply part 50 connected to the electrode parts 44.

First, a floating part 46 will be described.

The floating part 46 is configured to be floatable on a water surface 100 and has an external appearance that corresponds to the upper-end opening of the fence part 42 so that the fence part 42 can be attached at the lower end. For example, in the example illustrated in FIGS. 10 and 11, the floating part 46 is formed of a material that is floatable on the water surface 100, such as plastic foam, which is solid and has a loop shape and a virtually square cross-section. The floating part 46 has the fence part 42 attached to the lower end so as to be capable of holding the fence part 42 while floating on the water surface 100. Also, as will be described later, in the case where the fence part 42 further includes a bottom lid part 43, the floating part 46 also holds the bottom lid part 43 while floating on the water surface 100. Also, the floating part 46 may be formed to be hollow, such as a balloon, to be floatable on the water surface 100.

Next, the fence part 42 will be described.

The fence part 42 is formed of a mesh member in a cylindrical shape, for example, a cylinder as illustrated in FIG. 11. An upper opening end 42a of the fence part 42 is attached to the lower part of the floating part 46. The fence part 42 held by the floating part 46 floating on the water surface 100 is held in a state of floating underwater while maintaining a predetermined shape to a certain extent in the water. The fence part 42 has the upper opening end 42a of the fence part 42 supported in the vicinity of the water surface by the floating part 46, and extends downward from the water surface 100 toward the lower opening end 42b of the fence part 42.

In this way, the fence part 42 surrounds and encloses a predetermined underwater region 70 (referred to as an inner space 70, below) extending in the depth direction. For example, the fence part 42 can enclose one or more aquatic creatures 1 within the inner space 70.

The fence part 42 is formed of a fish cage net or the like, and the mesh of the fence part 42 is smaller than the size of the aquatic creatures 1. Therefore, the fence part 42 allows water (or liquid/fluid) to pass through and communicate between the inner space 70 and an exterior 71 of the inner space 70 (referred to as the outer space 71, be and blocks movement of the aquatic creatures 1 between the inner space 70 and the outer space 71 through the fence part 42. Specifically, water passes through the fence part 42, flows out of the inner space 70 toward the outer space 71, and flows into the inner space 70 from the outer space 71. Therefore, the height of the water surface inside the fence part 42 is the same as the height of the water surface outside the fence part 42. Also, the aquatic creatures 1 cannot come and go between the inner space 70 and the outer space 71 through the fence part 42.

Also, in the case where the aquatic creatures 1 come and go between the inner space 70 and the outer space 71 through the lower end of the fence part 42, the fence part 42 may further include a bottom lid part 43 attached to its lower end, as illustrated in FIGS. 10 and 11. The bottom lid part 43 is attached to the lower opening end 42b of the fence part 42 to close the lower end of the fence part 42. The bottom lid part 43, like the fence part 42, is formed of a fish cage net or the like. Therefore, attaching the bottom lid part 43 to the fence part 42 inhibits the aquatic creatures 1 from moving between the inner space 70 and the outer space 71.

Next, the electrode parts 44 will be described.

The electrode parts 44 include at least two electrode members and are provided inside the fence part 42, in particular, along the inner perimeter of the fence part 42. Also, the electrode parts 44 are provided in a predetermined underwater region at a depth higher than half the length between the upper and lower ends of the fence part 42, and are arranged in virtually in parallel with the water surface 100. For example, as illustrated in FIG. 11, the electrode parts 44 include a semicircular first electrode member 44a and a semicircular second electrode member 44b that are curved along the shape of a cross-section of the fence part 42 perpendicular to the depth direction.

The outside of the first electrode member 44a and the outside of the second electrode member 44b are attached to the inner surface of the fence part 42, and the first electrode member 44a and the second electrode member 44b are arranged to face each other. The first electrode member 44a and the second electrode member 44b are electrically separated and are provided, for example, at the same depth from the water surface 100.

Similar to the electrode parts 14 illustrated in FIG. 1, the electrode parts 44 are provided closer to the upper end of the fence part 42, namely, on the side away from the lower end (bottom part) by half the length between the upper and lower ends in the depth direction or more. More favorably, the electrode parts 44 are provided at an underwater depth between the water surface 100 and half the depth of the lower end of the fence part 42. Even more favorably, the electrode parts 44 are provided at an underwater depth between the water surface 100 and one-third the depth of the lower end of the fence part 42. The electrode part 44 is favorably provided at an underwater depth less than or equal to 1 m, more favorably, for example, greater than or equal to 1 cm, greater than or equal to 3 cm, greater than or equal to 5 cm, less than or equal to 50 cm, less than or equal to 30 cm, less than or equal to 20 cm, less than or equal to 10 cm, less than or equal to 5 cm, or a range combining these. Depth from the water surface 100 to the electrode parts 44 falling within the above-described range enables the jump-out prevention device 40 to prevent the aquatic creatures 1 from jumping out of the fence part 42.

The electrode parts 44 are held by the floating part 46 via the fence part 42. Therefore, the electrode parts 44 may be moved along in the depth direction together with the floating part 46 and the fence part 42, as the water surface 100 descends or rises while being immersed in water. For example, in the case where the fence part 42 is installed under the sea, the electrode parts 44 being movable along with the changing water surface enable to prevent the electrode parts 44 from coming out of the water surface due to the changing tide level and/or the strength of the waves, and thereby, enable to prevent the aquatic creatures from jumping out of the fence part 42 more securely.

Next, the power supply part 50 will be described.

The power supply part 50 is connected to the electrode parts 44 through wiring parts 51 to apply electrical pulses to the electrode parts 44. The power supply part 50 may apply electrical pulses, such as those illustrated in FIG. 5, to the first electrode member 44a and the second electrode member 44b. In this way, an electric field e can be formed to stimulate aquatic creatures in a predetermined region that expands inward from the inner perimeter surface of the fence part 42, to form a region that keeps off aquatic creatures whose jumping-out actions should be prevented as described above. Therefore, by inhibiting aquatic creatures from approaching such a region, it is possible to prevent aquatic creatures from jumping out of the water tank 11.

Also, as in the embodiments described above, parameters of the electrical pulses can be determined depending on the shape and size of the fence part 42, the type and size of the aquatic creatures, the water quality, and the like. The parameters may also be adjusted to be variable with time. For example, the frequency may vary periodically or randomly within a predetermined frequency range.

The jump-out prevention device 40 is installed outdoors on the sea, such as an aquaculture farm.

Next, a flow will be described by which the jump-out prevention device 40 prevents jumping-out actions of aquatic creatures.

In response to electrical pulses being applied to the electrode parts 44, the electrode parts 44 form an electric field in a desired underwater region surrounded by the fence part 42. The electric field acts as an electrical barrier to the aquatic creatures 1. Therefore, it is possible to prevent the aquatic creatures 1 from jumping out of the water surface 100 surrounded by the fence part 42 toward the outside of the fence part 42.

Also, since the electrode parts 44 attached to the fence part 42 move in the depth direction together with the floating part 46 and the fence part 42, a desired positional relationship in the depth direction between the electric field region formed by the electrode parts 44 and the water surface 100 is maintained. Therefore, even when the water surface 100 changes, the jump-out prevention device 40 can exhibit the effect of preventing jumping-out actions of the aquatic creatures 1.

As described above, the jump-out prevention device according to the present embodiment includes the floating part 46 to hold the fence part 42 and the electrode parts 44. The electrode parts 44 move along the depth direction together with the floating part 46 and the fence part 42 while being immersed in water. Therefore, even when the water surface 100 changes, it is possible to maintain the effect of preventing jumping-out actions of the aquatic creatures 1.

Further, water can come and go between the inner space 70 and the outer space 71 through the fence part 42 and the bottom lid part 43; therefore, the amount of water in the inner space 70, namely, the amount of water in the region inside the fence part 42 is constant. Therefore, it is not necessary to adjust the amount of water in the region inside the fence part 42, such as adding water to the region inside the fence part 42 or removing water from the region.

As long as the floating part 46 can hold the fence part 42 and the electrode parts 44 while maintaining the underwater positions of the electrode parts 44, the shape, size, and number of installed instances of the floating part are not limited in particular.

Also, although the electrode parts 44 include the first electrode member 44*a* and the second electrode member 44*b*, the installation configuration of the electrode parts 44 is not limited in particular as long as the electrode parts 44 include at least two electrode members. Also, depending on the cross-sectional shape of the fence part 42, the shape of the electrode parts 44 can be set properly.

Figure 12:
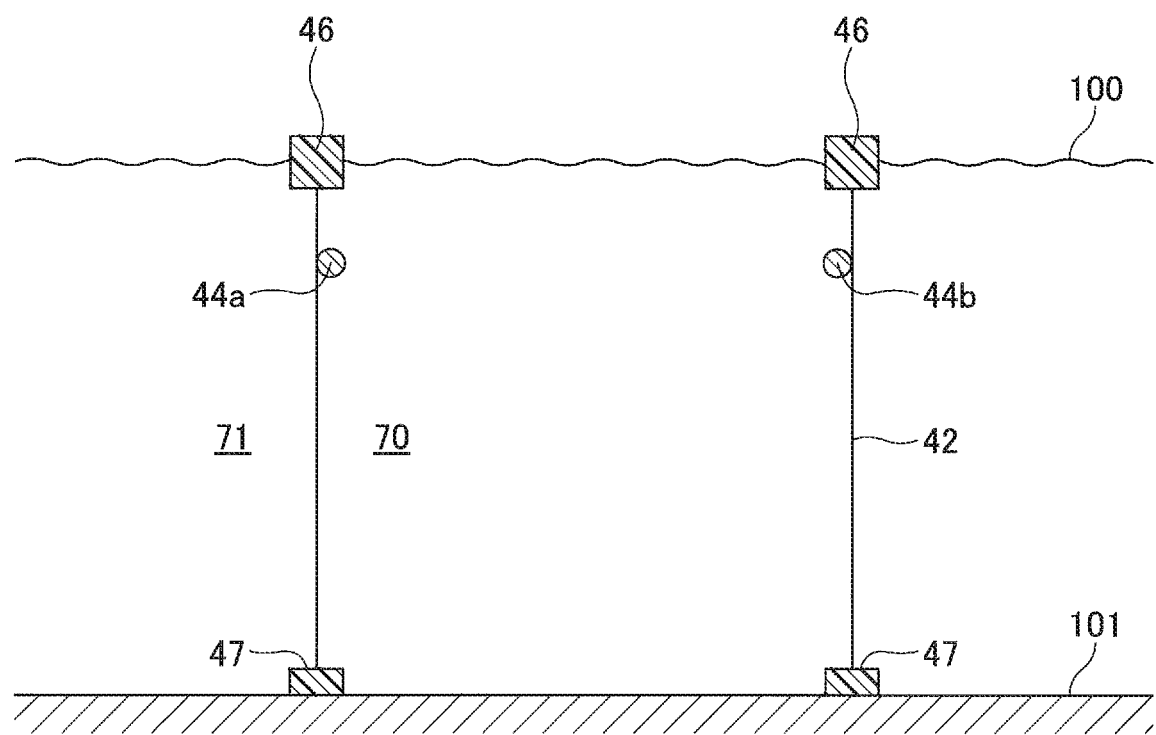
FIG. 12 is a cross-sectional view schematically illustrating a modified example of the jump-out prevention device for the aquatic creature in the fourth embodiment.

Also, as long as the electrode parts 44 are in contact with water, the electrode parts 44 may be attached to the inner surface of the fence part 42 as illustrated in FIG. 12, or the electrode parts 44 may be attached to a part of the floating part 46 in contact with water.

The shape of the fence part 42 is not limited in particular as long as being capable of enclosing one or more aquatic creatures 1 in the space inside the fence part 42, which may be cylindrical as illustrated in FIG. 11 or square tubular.

The jump-out prevention device according to the present embodiment may further include a fixed part. FIG. 12 is a cross-sectional view illustrating a modified example of the jump-out prevention device according to the present embodiment.

As illustrated in FIG. 12, the jump-out prevention device includes a floating part 46, a fence part 42, electrode parts 44, a power supply part 50, and a fixed part 47 attached to the lower end of the fence part 42. The fixed part 47 is made of a material that sinks in water and is provided on a bottom of water 101. Also, the fixed part 47 is attached to a lower opening end 42*b* of the fence part 42 along the shape of the lower opening end 42*b*. For example, the fixed part 47 has a ring shape.

The fixed part 47 does not float by the buoyancy of the floating part 46, and an installed state of the fixed part 47 with respect to the bottom of water 101 is maintained, and thereby, the fence part 42 is fixed to the bottom of water 101 via the fixed part 47. Therefore, the fixed part 47 can avoid drifting of the jump-out prevention device. The bottom of water 101 also functions as the bottom lid part 43 illustrated in FIGS. 11 and 12 with respect to the fence part 42. Therefore, the jump-out prevention device fixed to the bottom of water 101 can avoid, without the bottom lid part 43, a situation where aquatic creatures 1 come and go between the inner space 70 and the outer space 71 through the lower end side of the fence part 42.

According to the embodiments described above, without installing a it is possible to prevent aquatic creatures from jumping out of a device such as a water tank or a fish cage.

As above, the embodiments have been described in detail. Note that the present invention is not limited to the embodiments described above, and various modifications and changes can be applied to the embodiments described above without departing from the scope described in the claims. Also, it is needless to say that part or all of the elements of an embodiment described above can be appropriately combined with another embodiment.

This international application claims priority base on Japanese Patent Application No. 2017-151082 filed on Aug. 3, 2017, entire contents of which are incorporated herein by reference.

LIST OF REFERENCE SYMBOLS 1 aquatic creatures
10 jump-out prevention device
11 water tank
12 sidewall part
13 bottom part
14 electrode part
50 power supply part
51 wiring part
100 water surface

The invention claimed is:

1. A jump-out prevention device for an aquatic creature, comprising:
electrode parts arranged along an inner perimeter of a water tank for keeping the aquatic creature; and
a power supply part electrically connected to the electrode parts, and configured to apply electrical pulses to the electrode parts,
wherein each of the electrode parts extend in a horizontal direction partially or entirely over the inner perimeter of the water tank, and are arranged in a predetermined underwater region in the water tank at a same depth from a water surface on all side surfaces of the water tank, and
wherein the electrical pulses are applied to the electrode parts.

2. The jump-out prevention device for the aquatic creature as claimed in claim 1, wherein the electrode parts are attached to the inner circumferential surface of the water tank.

3. The jump-out prevention device for the aquatic creature as claimed in claim 1, further comprising:
a floating part configured to be floatable on a water surface,
wherein the electrode parts are attached to a lower part of the floating part.

4. The jump-out prevention device for the aquatic creature as claimed in claim 1, wherein each of the electrode parts are provided at a height higher than half a height of the water tank or half a water level in the water tank.

5. A jump-out prevention device for an aquatic creature, comprising:
electrode parts arranged along an inner perimeter of an enclosure part to surround and enclose the aquatic creature, the enclosure part being tubular; and
a power supply part electrically connected to the electrode parts to apply electrical pulses to the electrode parts,
wherein each of the electrode parts extend in a horizontal direction partially or entirely over the inner perimeter of the enclosure part, and are arranged in a predetermined underwater region at a height higher than half a height of the enclosure part, each of the electrode parts being provided at a same depth from a water surface on all side surfaces of the water tank, and
wherein the electrical pulses are applied to the electrode parts.

6. The jump-out prevention device for the aquatic creature as claimed in claim 5, further comprising:
a floating part configured to be floatable on a water surface, wherein the enclosure part is attached to the floating part and is supported underwater by the floating part.

7. The jump-out prevention device for the aquatic creature as claimed in claim 6, wherein the electrode parts are attached to the enclosure part, to be supported by the floating part via the enclosure part.

8. The jump-out prevention device for the aquatic creature as claimed in claim 5, wherein each of the electrode parts are provided at a height higher than half a water level in the enclosure part.

* * * * *